(12) United States Patent
Tyler et al.

(10) Patent No.: US 7,556,064 B2
(45) Date of Patent: Jul. 7, 2009

(54) APPARATUS AND METHOD FOR CONTROLLING THE FILLING AND EMPTYING OF A FLUID CONTAINER

(76) Inventors: Michael E. Tyler, 14615 San Pedro #235, San Antonio, TX (US) 78232; Paul M. Whetstone, 29890 Bulverde La. #14, Bulverde, TX (US) 78163

( * ) Notice: Subject to any disclaimer, the term of this patent is extended or adjusted under 35 U.S.C. 154(b) by 586 days.

(21) Appl. No.: 11/325,157

(22) Filed: Jan. 4, 2006

(65) Prior Publication Data
US 2007/0151627 A1 Jul. 5, 2007

Related U.S. Application Data

(60) Provisional application No. 60/646,824, filed on Jan. 22, 2005.

(51) Int. Cl.
*F16L 55/04* (2006.01)
(52) U.S. Cl. ............ 138/30; 138/45
(58) Field of Classification Search .......... 138/30, 138/44, 45
See application file for complete search history.

(56) References Cited

U.S. PATENT DOCUMENTS

| | | | |
|---|---|---|---|
| 3,406,722 A * | 10/1968 | Ruth ............ | 138/30 |
| 3,536,102 A * | 10/1970 | Zahid et al. ........ | 138/30 |
| 4,432,393 A * | 2/1984 | Mills ............ | 138/30 |
| 4,923,091 A | 5/1990 | Sutera | |
| 5,111,966 A | 5/1992 | Fridman | |
| 5,114,042 A | 5/1992 | Sutera | |
| 5,368,197 A | 11/1994 | Sutera | |
| 5,971,220 A | 10/1999 | Payne | |
| 6,354,344 B1 | 3/2002 | Pluta | |
| 7,025,092 B2 * | 4/2006 | Swaffield et al. ........ | 138/30 |
| 7,353,845 B2 * | 4/2008 | Underwood et al. ........ | 138/30 |

* cited by examiner

*Primary Examiner*—Patrick F Brinson
(74) *Attorney, Agent, or Firm*—David Allen Hall

(57) ABSTRACT

An apparatus and method for emptying and filling a fluid container. A valve is constructed in part of two concentric tubes. Flow of a fluid through the outer tube of two concentric tubes is regulated by the flow of the same or another fluid through the inner tube. The two flows can be in the same or opposite directions. A cap containing the valve and a vent tube can be installed on a modified bottle used to supply water dispensers, thus enabling a user to continuously replenish the bottle from a remote supply. Alternatively, a cap containing the valve, a vent tube, and two fluid level sensors can be installed on a conventional bottle. A user is thus relieved of the burden of repetitive bottle changing, and is able to treat the water to his own specifications.

1 Claim, 4 Drawing Sheets

APPARATUS AND METHOD FOR CONTROLLING THE FILLING AND EMPTYING OF A FLUID CONTAINER

This application claims priority from provisional application 60/646,824 filed Jan. 22, 2005.

FIELD OF THE INVENTION

The present invention pertains to the field of fluidics, specifically to the field of controlling fluid flow into and out of containers.

BACKGROUND OF THE INVENTION

Devices that dispense water from pre-filled bottles are common, but providing such devices with refills poses several problems. Replacing a water bottle always involves some possibility of spillage while removing a partially empty bottle and inverting a full replacement bottle. Because a gallon of water weighs over eight pounds, transporting a bottle containing water sufficient to last a reasonable time, say five gallons, is not trivial, particularly when the bottle must be carried up stairs or for an appreciable distance. Also, a water bottle must be turned upside down and hoisted on top of the typical water dispenser, a difficult task for a person of slight build. Constant replacement of water bottles therefore presents frequently recurring opportunities for injury and spillage. Payne, in U.S. Pat. No. 5,971,220, addressed the replacement problem with an invention for assisting in the inversion and lifting of a replacement bottle, but did not alleviate the need for replacement of a bottle when it has been emptied.

Another concern of consumers of bottled water is that they have no convenient means of being assured of the purity of the water they drink. Pluta (U.S. Pat. No. 6,354,344) discloses disposable and replaceable filters that offer some water treatment, but his invention does not affect the need for replacement of empty bottles.

Sutera (U.S. Pat. Nos. 5,368,197, 5,114,042, and 4,923,091) discloses a self-filling bottled-water cooler conversion kit that addresses the problem of frequent replacement of supply bottles. The Sutera invention utilizes a conventional mechanical float mechanism typically seen in water troughs and commodes. The Sutera float valve is prone to the same frequent failures associated with the water trough and commode valves. Moreover, the float is a large device which most consumers will consider unsightly and even unsanitary when viewed inside a bottle of drinking water. Sutera concedes his invention's aesthetic shortcoming by describing a transparent float (column 7, line 23 in the '042 patent; column 7, line 34 in the '197 patent).

Fridman (U.S. Pat. No. 5,111,966) discloses a cabinet that dispenses water from a constant supply through an inverted water bottle. Hidden inside the Fridman cabinet below the first container bottle is a small second container within a third container. As does Sutera, Fridman depends on a mechanical float valve that operates inside the third container. Fridman also employs a sensor that monitors the head pressure in the bottle and opens and closes a supply valve accordingly. Fridman's design does not accommodate an existing bottled water dispenser; it requires an internal reservoir-within-a-reservoir that completely supplants the internal reservoir of a conventional water dispenser.

For water and juices, aesthetics plays a part in dispenser design. Many consumers prefer to see the water and juices they drink coming from a clear bottle rather than from the types of industrial water coolers that merely pipe a supply of fluid through a refrigeration unit inside a cabinet. Therefore, it is desirable to provide a combination of a constant fluid supply means with the aesthetics of a container in which the fluid is visible.

SUMMARY OF THE INVENTION

The present invention is a fill valve and a method of using that fill valve that make replacement of bottles of fluid on a fluid dispenser unnecessary. The preferred embodiment of the fill valve and method pertain to a water dispenser, and make possible the repeated in situ refilling of a water bottle with water that can be filtered and treated independently of the water dispenser to any level of purity the consumer's supply is capable of attaining. Therefore, what is disclosed and claimed for the preferred embodiment is a novel valve and a method of using that valve that combines the convenience and safety of a constant treated water supply, the aesthetics of a conventional water dispenser, and the economical benefit of very little, if any, retrofit required of an already installed water dispenser.

The preferred embodiment of the present invention fill valve is capable of being utilized on commercially available, existing water dispenser reservoirs. A new bottle is installed on the consumer's water dispenser. The new bottle's cap is capable of accommodating a vent tube and a fill tube that incorporates a fill valve. The preferred embodiment of the method of the present invention uses electronic fluid level control sensors instead of float valves.

BRIEF DESCRIPTION OF THE DRAWINGS

The present invention will be more readily understood with reference to the accompanying drawings in which like reference numerals designate like elements throughout the several views.

DEFINITION OF CLAIM TERMS

The following terms are used in the claims of the patent as filed and are intended to have their broadest meaning consistent with the requirements of law. Where alternative meanings are possible, the broadest meaning is intended. All words and phrases are to be interpreted as they are preferentially defined in commonly accepted English language dictionaries, handbooks, textbooks, and treatises except where defined in the present Specification. All words used in the claims are intended to be used in the customary usage of grammar and the English language.

"Fluid level control sensor" means a device, including, but not limited to, resistive elements, switches, and floats capable of reacting to the presence or absence of fluid with mechanical, electrical, or fluidic responses.

"Regulate" means to turn on, turn off, or adjust the flow of a fluid.

"Valve" means a device capable of being inserted into a flow stream and capable of regulating the flow of the fluid in that flow stream.

"Fill valve" means a valve that regulates the flow of a fluid into and out of a container.

"Tube" means a conduit the lateral cross section of which is not necessarily round.

"Flow restrictor" means a device capable of decreasing the volumetric flow rate in a conduit.

"Annulus" means the space between two tubes arranged one within the other, whether round, concentric, or otherwise.

DETAILED DESCRIPTION OF THE PREFERRED EMBODIMENT

Figure 1:
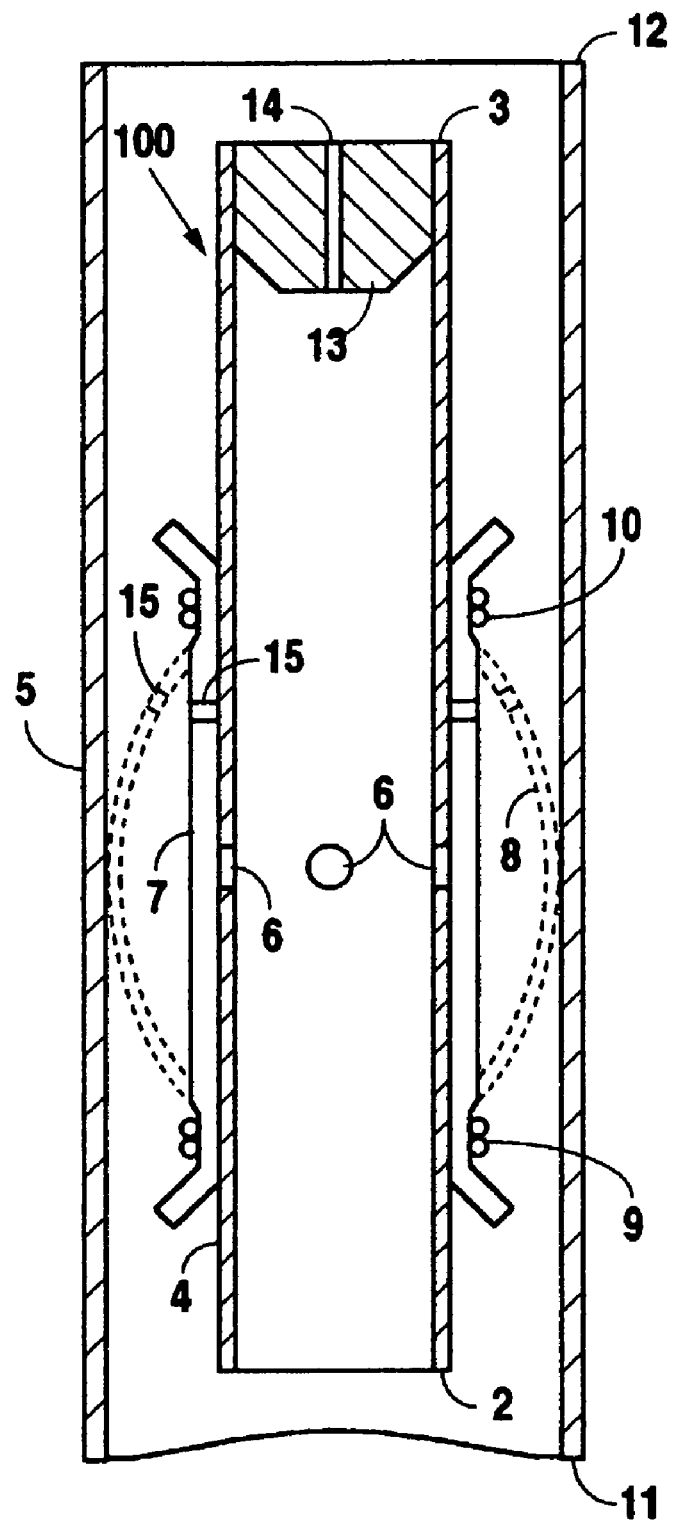
FIG. 1 is a cross sectional drawing of the preferred embodiment of the fill valve of the present invention located inside a fill tube.

FIG. 1 shows the preferred embodiment of the fill valve 100 of the present invention inside a fill tube 5. Fill valve 100 is partially comprised of a flexible tube 4 having inlet end 2 and outlet end 3. Inserted into or attached to outlet end 3 is a flow restrictor 13 that permits flow only through a small diameter flow restrictor orifice 14. Four small holes 6, spaced approximately 90 degrees apart, penetrate the wall of tube 4. Covering holes 6 is a flexible tube 7 the inner diameter of which is substantially the same as the outer diameter of tube 4, but the length of which is shorter than the length of tube 4. After inserting tube 4 through tube 7, both ends of tube 7 are tightly fixed to tube 4 with aviation safety wire 9 and 10 or equivalent clamping or holding devices. The fixations provide fluid-tight junctures between tubes 4 and 7. Fill valve 100 (tubes 4 and 7, clamps 9 and 10, and flow restrictor 13) is fitted inside a fill tube 5 having ends 11 and 12.

In operation, fill valve 100 is capable of controlling the flow of a fluid in either direction in the annulus between tubes 4 and 5. For example, when a fluid flows in tube 4 from inlet end 2 to outlet end 3, fluid is also capable of flowing in either direction in the annulus between tubes 4 and 5. However, flow restrictor 13 will cause pressure to increase in the fluid occupying the part of tube 4 in the vicinity of tube 7. Some of that fluid will flow through holes 6, causing flexible tube 7 to be deformed into a circumferential bulge 8 (illustrated with dashed lines in FIG. 1) around tube 4. The bulge will circumferentially seal the annulus between tubes 4 and 5, thus preventing fluid flow in the annulus. Hence, flow inside tube 4 activates the valve action of fill valve 100 by which flow between tubes 4 and 5 may be allowed or stopped.

In addition to acting as an off-on valve with regard to fluid flow between tubes 4 and 5, fill valve 100 is capable of regulating that flow. By controlling the pressure inside tube 4, either by varying the outlet restriction or inlet flow rate, the deformation of tube 7, i.e. the size of bulge 8, can be controlled such that some, but not all, of the annulus between tubes 4 and 5 can be blocked. Several commonly understood means may be employed by which the effective diameter of flow restrictor orifice 14 can be varied. One such means is a conical plunger that can be moved in and out of flow restrictor orifice 14. Another such means is a shutter similar to the light-controlling shutter of a camera. Another such means is the use of multiple orifices 14 that can be selectively opened and closed or blocked and unblocked.

The present invention fill valve 100 performs satisfactorily with up to approximately 60 psi inside ¼ inch O.D. white John Guest® tubing as tube 4, four approximate ¼ inch long scalpel slits that serve as the four holes 6 in tube 4, ¼ inch I.D. white New Age silicon tubing as the elastic tube that deforms into bulge 8, and a 23 gauge syringe press fit, needle end first, into outlet end 3 of tube 4. The syringe serves as flow restrictor 13, and the inner diameter of the 23 gauge syringe provides a 0.013 inch diameter flow restrictor orifice 14. For the present invention, silicon tube 7 is preconditioned for its elastic function by closing one end and inflating it until its pearl white color turns bright white, and then allowing the tube to return to its normal configuration and pearl white color before installing and clamping it on tube 4.

The feature that enables the preferred embodiment of fill valve 100 to function reliably at higher pressures is at least one small hole or slit 15 that allows fluid to escape from the inside of bulge 8 when fluid pressure inside bulge 8 increases to a magnitude sufficient to open hole 15. The amount of fluid escaping through hole 15 is not sufficient to cause bulge 8 to collapse and defeat its designed function of blocking external flow. Hole 15 therefore acts as a relief valve to prevent bursting of bulge 8 or leakage under clamping devices 9 and 10 in the event of undesirable pressure buildup inside tube 4.

Hole 15 is sized so that it opens only when a predetermined pressure is present in the fluid filling the space between tube 4 and bulge 8. It is understood that various thicknesses of various elastic materials will require different quantities and diameters of hole 15 to perform as desired. The present invention preferred embodiment 100 performs satisfactorily with 80 psi inside tube 4 if one 30 gauge (0.012 inch) diameter hole 15 penetrates tube 7 as shown in FIG. 1.

Figure 2:
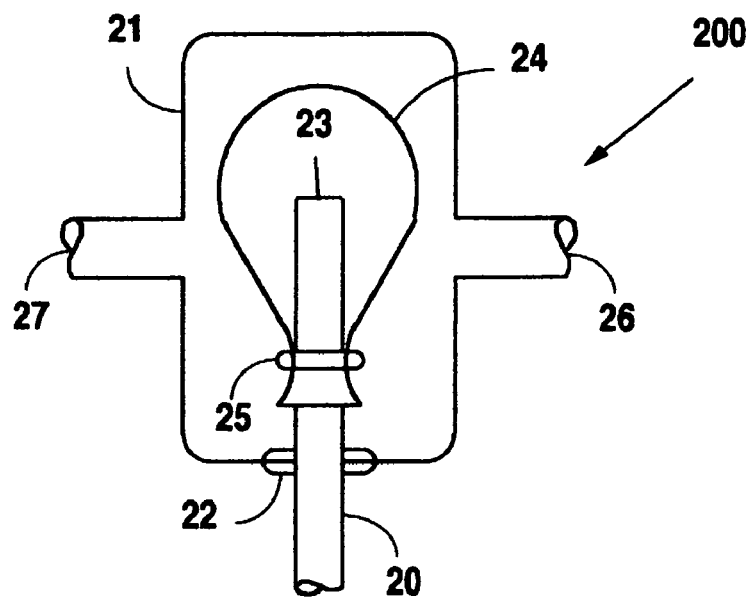
FIG. 2 is a cross sectional drawing of a first alternative embodiment of the fill valve of the present invention.

FIG. 2 shows an alternate embodiment 200 of the fill valve of the present invention. Fill valve 200 can be a modular unit capable of being installed in a fluid line at tubes 26 and 27. With fill valve 200 inactivated, flow between tubes 26 and 27, through fill valve body 21, is unimpeded. Balloon 24 is clamped to tube 20 with clamping device 25 that can be the same or similar to the clamping devices 9 and 10 illustrated in FIG. 1. The penetration of fill valve body 21 by tube 20 is rendered leak proof with grommet, seal, or sealant 22. When a separate fluid, which may or may not be the same fluid as that flowing through fill valve body 21, is introduced into the flexible balloon 24 through tube 20 and its opening 23, balloon 24 expands into the interior of fill valve body 21. The expansion of balloon 24 thus is capable of regulating or stopping the flow between tubes 26 and 27, depending on the state of the flow into tube 20.

Figure 3:
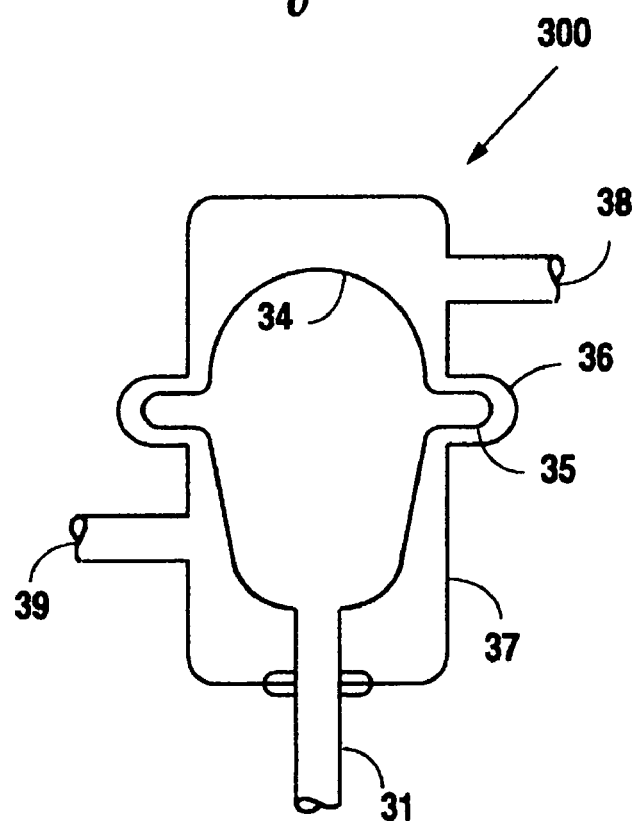
FIG. 3 is a cross sectional drawing of a second alternative embodiment of the fill valve of the present invention.

FIG. 3 shows an alternate embodiment 300 of the fill valve of the present invention. Fill valve 300 operates like fill valve 200, with the exception that a circumferential cavity 36 is built into fill valve body 37, and balloon 34 has a circumferential protrusion 35 that fits into cavity 36. When a fluid is introduced into tube 31 and balloon 34, causing balloon 34 to expand, balloon protrusion 35 partially or completely fills fill valve body cavity 36 and chokes or stops fluid flow between tubes 38 and 39.

Figure 4:
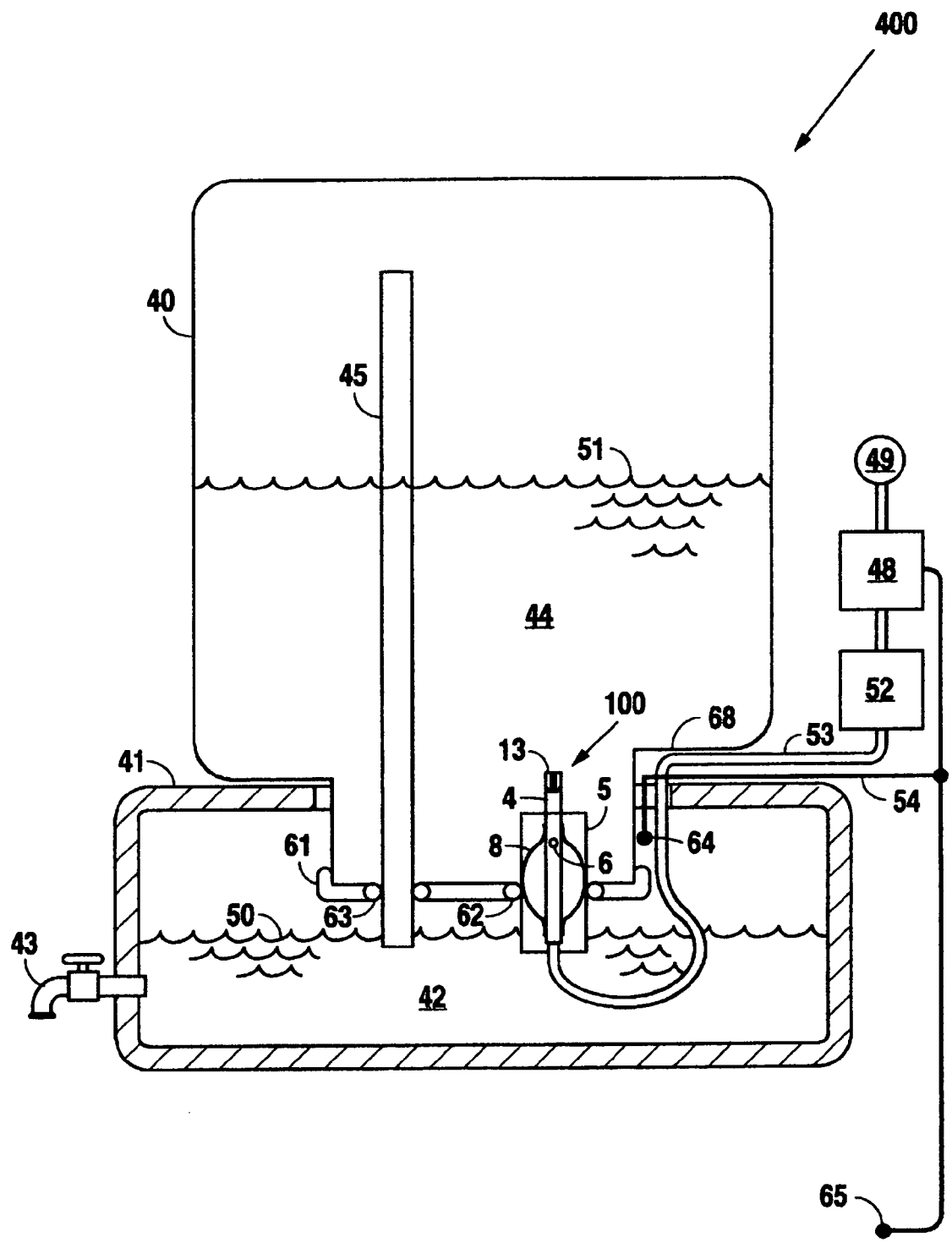
FIG. 4 is a diagram illustrating the preferred method of use of the fill valve of the present invention.

FIG. 4 illustrates the preferred embodiment method 400 of using the preferred embodiment fill valve 100 of the present invention. Fill valve 100 with flow restrictor 13 is installed in fill tube 5 that is fitted into cap 61 of bottle 40 with water tight grommet 62. Vent tube 45 is also fitted into cap 61 with water tight grommet 63. Alternative bottle cap construction can include integral tubes and tubes sealed with O-rings and other commonly understood water tight fittings. It is also feasible to manufacture an injection molded bottle complete with cap and tubes.

When water bottle 40, initially filled with water 44, is turned upside down, as illustrated in FIG. 4, and installed on base reservoir 41, water flows through vent tube 45 and the annulus between tubes 4 and 5 when balloon 8 is in its unexpanded configuration illustrated as item 7 in FIG. 1. As water flows out of bottle 40 into base reservoir 41, air flows from base reservoir 41 into bottle 40 through vent tube 45 and the annulus between tubes 4 and 5. When the water 42 in base reservoir 41 rises to the level of the lower ends of vent tube 45 and fill tube 5 at level 50, air can no longer enter vent tube 45 or fill tube 5, and no more water can flow from bottle 40 into base reservoir 41. Functionality is not impaired if the lower ends of vent tube 45 and fill tube 5 are at different elevations.

As users draw water 42 from base reservoir 41 through tap 43, the water level in base reservoir 41 drops below level 50, and water again flows from bottle 40 into base reservoir 41 through vent tube 45 and through the annulus between tubes 4 and 5. Air enters the bottom end of vent tube 45, and as it rises to the top end of vent tube 45 it blows any water remaining in vent tube 45 upward against the inside of bottle 40. The cycle of draining water from reservoir 41 through tap 43 and refilling reservoir 41 to level 50 with water from bottle 40 continues until the water in bottle 40 is nearly depleted. When the water level in bottle 40 drops just below the level of the top of fill tube 5, no more water can drain out of bottle 40 into reservoir 41. Water can still be drawn through tap 43 as long as the water level in reservoir 41 remains high enough to enter the inlet (reservoir) end of tap 43. If a user subsequently tries and fails to draw water from tap 43, flow control valve 48 may be manually opened. Also, a clock timer attached to or incorporated into flow control valve 48 can be programmed or preset to open and close the valve at certain predetermined times. Such an automatic timer feature permits filling of bottle 40 at predetermined hours, such as nighttime or weekends, whether reservoir 41 has been completely depleted or not.

Turning on or opening flow control valve 48 initiates a flow of water from a municipal, cistern, well, or other supply 49. The supply water then, if desired, flows through a treatment system 52, through a supply tube 53 that is led along or through a tunnel, cavity, or collar in area 68 of a portion of the shoulder of bottle 40, into tube 4 and flow restrictor 13, and into bottle 40. Treatment system 52 can include a filtration or reverse osmosis process, or dosing with ultraviolet light, chlorine, chloramines, or other chemicals. The connection of supply tube 53 to tube 4 can be made upon first installing bottle 40 on base reservoir 41, can be made inside or outside base reservoir 41, and can be made with commonly understood pipe fittings such as tubular couplings or with more elaborate leak-proof push-in fittings such as the John Guest® line of Speedfit® fittings.

With flow control valve 48 on or open, water flows through fill valve 100, and the water flow is restricted by flow restrictor 13. The subsequent pressure increase inside tube 4 forces water through holes 6. The water escaping through holes 6 deforms balloon 8 into its expanded configuration illustrated in FIG. 4. In its expanded configuration balloon 8 stops the flow of water from bottle 40 into base reservoir 41 through the annulus between tubes 4 and 5. With no means of draining, the water level in bottle 40 rises due to the inflow of water through tube 4 and flow restrictor 13, and air is forced out of bottle 40 through vent tube 45. The water level in bottle 40 rises, and when the water level in bottle 40 reaches the top of vent tube 45, water flows through vent tube 45 into reservoir 41, thus raising the level of water in reservoir 41.

Either by manual actuation of a valve controlling the supply, or at predetermined and preset times controlled by a timed control valve, bottle 40 is filled from the bottom (which is actually the top of the bottle when it is in its upright position before installation on a water dispenser). But every time a full bottle begins to drain, it drains from the top of vent tube 45 into reservoir 41. Therefore, every time water drains from a full bottle 40, any floating detritus, debris, or biomass will be flushed through the system sooner than it would if all drainage occurred at the bottom of bottle 40, as is the case with conventional water dispensers. Because biomass longevity in potable water increases opportunity for bacteria growth, the initial drainage from the top water surface is an enhanced health and safety feature of the present invention over conventional water dispensers.

The preferred embodiment of the method of the present invention includes two optional safety features. FIG. 4 illustrates how water damage can be averted in the event of overfilling of reservoir 41 or in the event of leakage around a tube seal such as grommet 62 or 63, or around the circumference of bottle cap 61. If such overfilling or leakage occurs, and little or no water is drawn thorough tap 43, water 44 from bottle 40 could fill base reservoir 41 and overflow, resulting in water pooling around the base of the water dispenser.

Liquid level sensors 64 and 65 minimize or eliminate damage that might occur as a result of such circumstances. When the level of water 42 in base reservoir 41 rises to the level of liquid level sensor 64, that sensor sends a signal through lead 54. That signal can turn off flow control valve 48, thus preventing any further flow of water into bottle 40. The signal from liquid level sensor 64 can also be used to trigger audio, visual, and telephonic alarms. Liquid level sensor 65 performs a similar safety function. It can be installed in a pan in which the water dispenser sits. If water pools in the pan, sensor 65 can turn off flow control valve 48 and trigger audio, visual, and telephonic alarms.

Figure 5:
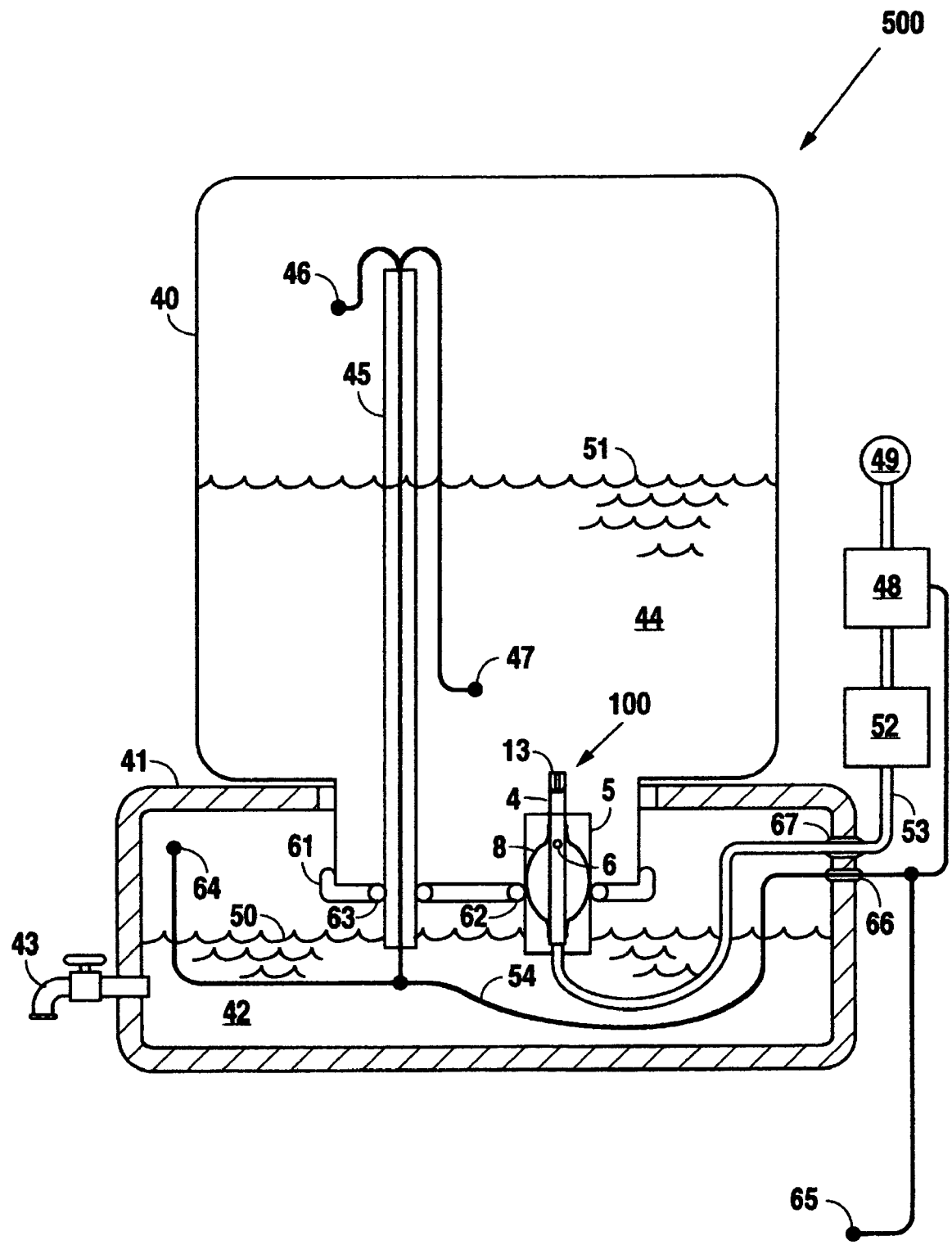
FIG. 5 is a diagram illustrating an alternate embodiment of the method of use of the fill valve of the present invention.

FIG. 5 illustrates an alternate embodiment 500 of the method of use of the fill valve of the present invention. As water is drawn through tap 43, water from bottle 40 drains into base reservoir 41, and the level of water 44 in bottle 40 eventually drops to the level of the lower fluid level control sensor 47, at which time sensor 47 sends a signal through lead 54, which is led out of base reservoir 40 through a water tight grommet 66, to turn on the flow control valve 48 that initiates a flow of water from supply 49. The supply water then, if desired, flows through a treatment system 52, through a supply tube 53 that penetrates a wall of base reservoir 41 through a water tight grommet 67, into tube 4 and flow restrictor 13, and into bottle 40. Treatment system 52 can include a filtration or reverse osmosis process, or dosing with ultraviolet light, chlorine, chloramines, or other chemicals. The connection of supply tube 53 to tube 4 can be made upon first installing bottle 40 on base reservoir 41, can be made inside or outside base reservoir 41, and can be made with commonly understood pipe fittings such as tubular couplings or with more elaborate leak-proof push-in fittings such as the John Guest® line of Speedfit® fittings.

As water flows through fill valve 100, its flow is restricted by flow restrictor 13, and the subsequent pressure increase inside tube 4 forces water through holes 6. The water escaping through holes 6 deforms balloon 8 into its expanded configuration illustrated in FIG. 5. In its expanded configuration balloon 8 stops the flow of water from bottle 40 into base reservoir 41 through the annulus between tubes 4 and 5. With no means of draining, the water level in bottle 40 rises due to the inflow of water through tube 4 and flow restrictor 13, and air is forced out vent tube 45. The water level in bottle 40 rises until it reaches the level of the upper fluid level control sensor 46, at which time sensor 46 sends a signal through lead 54 to turn off flow control valve 48, thus ending the flow of water into bottle 40.

When flow control valve 48 is turned off and water ceases to flow through tube 4, the flow through holes 6 stops, and the balloon in fill valve 100 returns to its unexpanded configuration illustrated as item 7 in FIG. 1. With the annulus between tubes 4 and 5 unblocked, water is free to flow through that annulus from bottle 40 into base reservoir 41 as water is drawn through tap 43.

Alternate embodiment 500 of the method of use of the fill valve of the present invention includes the same two optional safety features described above as part of preferred embodiment 400. FIG. 5 illustrates the placement of liquid level sensors 64 and 65 for minimization or elimination of damage that might occur as a result of water leaks or overfilling.

Timed refilling of bottle 40 presents an element of economy not found in typical water supply systems, particularly for reverse osmosis systems. For example, a water dispenser control valve 48 programmed or set to permit flow through a reverse osmosis system only during the night-time hours will only produce waste brine during those hours, rather than all day long. Typical reverse osmosis systems produce waste brine as the system reservoir is filling with treated water forced by line pressure through a membrane. The back pressure of a full reservoir prevents fluid flow across the membrane, thus diverting supply water into the waste brine seam. Such diversion is wasteful, and can be eliminated or minimized if the operation of control valve 48 is timed to provide the volume of water required by the capacity of bottle 40 and the number of installed dispensers. Many commercially available timers are capable of providing the desired timing capability. One such timer is the Intermatic model 6X761 Multi-Operational Timer distributed by Grainger, Inc.

It will be apparent to those with ordinary skill in the relevant art having the benefit of this disclosure that the present invention provides an apparatus and method for controlling the filling and emptying of a container of any fluid. It is understood that the forms of the invention shown and described in the detailed description and the drawings are to be taken merely as presently preferred examples and that the invention is limited only by the language of the claims. While the present invention has been described in terms of one preferred embodiment and various variations thereof, it will be apparent to those skilled in the art that form and detail modifications may be made to those embodiments without departing from the spirit or scope of the invention.

We claim:

1. A fill valve comprising:
   a first tube having an upstream end, a downstream end, a first tube wall, and a first penetration through said first tube wall;
   a second tube made of elastic material and being shorter than said first tube and having a first end, a second end, and a second tube wall, said second tube fitted over and attached to said first tube substantially concentrically, said second tube covering said first penetration;
   a flow restrictor located near said downstream end of said first tube; and
   a second penetration through said wall of said second tube.

* * * * *